United States Patent Office 2,797,188
Patented June 25, 1957

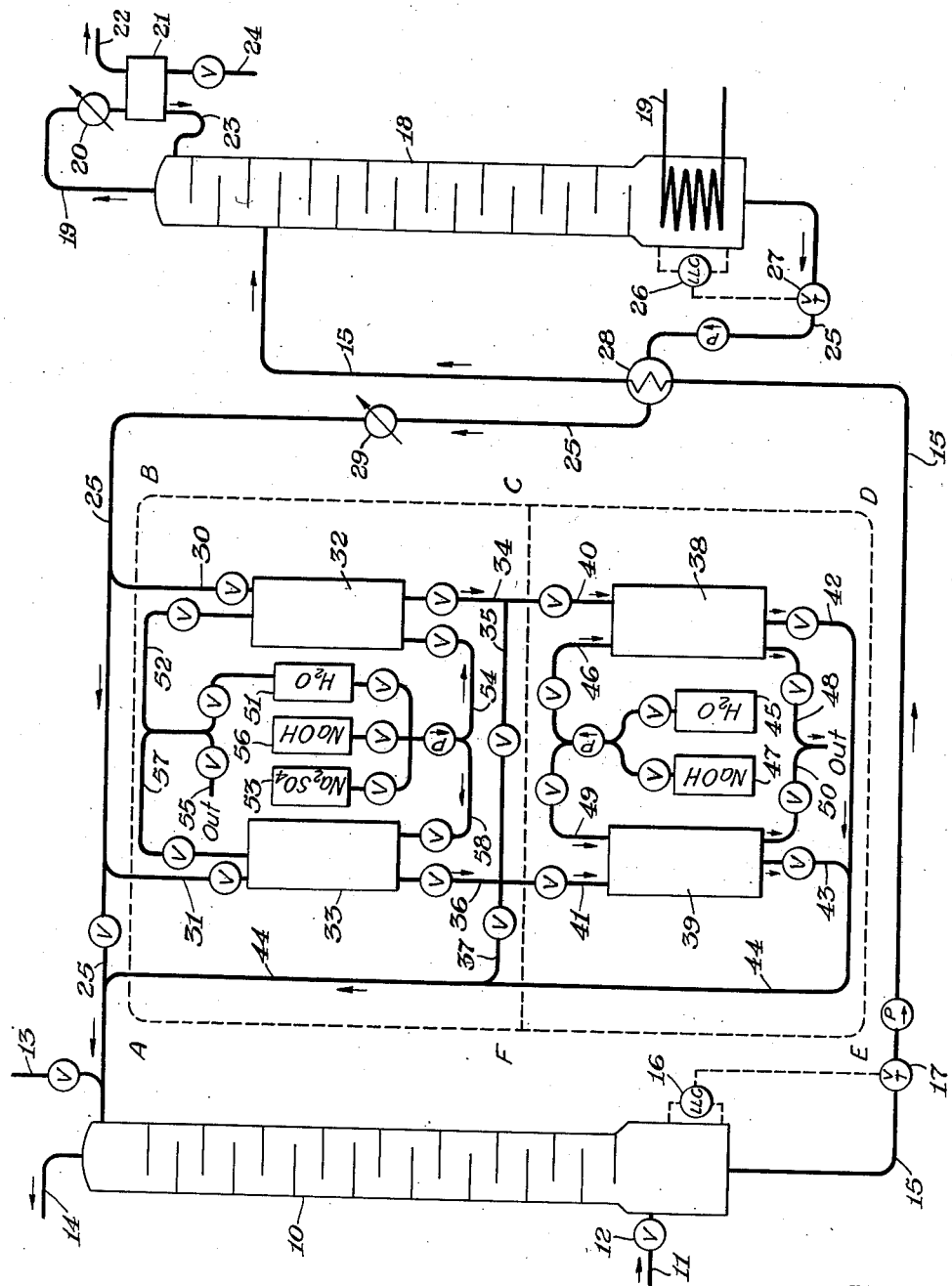

2,797,188

REFINING PETROLEUM WITH AN ALKANOL-AMINE ABSORBENT AND REACTIVATION OF THE SPENT ALKANOL AMINE

Frank Carter Taylor, Jr., and Glenn E. Prielipp, Bay City, Mich., assignors to The Dow Chemical Company, Midland, Mich., a corporation of Delaware Application December 4, 1953, Serial No. 396,268

10 Claims. (Cl. 196—32)

This invention relates to processes for removing acidic constituents from fluids by means of absorbents which comprise alkanol amines. It pertains especially to such processes wherein acid gases such as hydrogen sulfide and carbon dioxide are absorbed from petroleum hydrocarbon fluids by aqueous liquid mixtures comprising alkanol amines and wherein the absorbed acid gases are liberated and expelled by heating and/or steam stripping of the used absorbent. The invention concerns particularly such processes in which the aqueous alkanol amine absorbent tends to become inactivated by reaction with other acidic substances which are also absorbed from the impure hydrocarbon fluids and/or which are generated by chemical reaction within the absorbent solution and which are not liberated by heat and/or steam stripping of the absorbent.

In many processing industries, e. g. the petroleum industry, acidic constituents of fluid streams are now being removed from such fluids by scrubbing the same with liquid absorbents which comprise alkanol amines, e. g. monoethanol amine, diethanol amine, triethanol amine, methyldiethanol amine, isopropanol amines and the like. The acidic material reacts with the alkanol amine to form a non-volatile salt soluble in the absorbent medium. When such acid materials consist of hydrogen sulfide and/or carbon dioxide, the used absorbent containing the corresponding alkanol amine salts can be reclaimed by heating to the boiling point and/or by blowing steam or other inert vapor therethrough, whereby the salt-forming reaction is reversed. The hydrogen sulfide and/or carbon dioxide are liberated and expelled and the alkanol amine absorbent is regenerated by such heating step.

However, in some processes the alkanol amine absorbent mixture becomes contaminated with salts of acids which are not readily liberated by conventional heating or steaming operations. In such instances, the absorption capacity of the alkanol amine solution is decreased proportionately to the concentration of stable salts present therein. Often other deleterious consequences of stable salt formation are observed, such as viscosity changes, foaming, precipitation of insoluble materials and the like. Ultimately, in cyclic processes, the contaminated absorbent becomes unfit for further use and must be discarded or reclaimed by more rigorous methods than simple heating and/or steam stripping.

For example, a petroleum refinery hydrocarbon gas stream such as the overhead stream from a gasoline stabilizer is scrubbed with an aqueous liquid diethanol amine solution to remove the acidic gas impurities which are largely hydrogen sulfide with lesser amounts of carbon dioxide and other acidic materials. The used absorbent, which contains the diethanol amine salts of hydrosulfuric acid and carbonic acid, is reactivated by heating to the boiling point, whereby the hydrogen sulfide and carbon dioxide are expelled from the solution and the diethanol amine solution is regenerated and returned to the gas scrubber. However, the spent alkanol amine absorbent from the scrubber usually contains the alkanol amine salts of other acidic materials such as hydrocyanic acid, thiocyanic acid, complex metal cyanic acids, formic acid, acetic acid and the like, some of which acidic materials form stable salts with the alkanol amine in the absorbent. Herein the thiocyanate and formate salts of alkanol amine are referred to as representative of such stable salts. These salts are not readily dissociated by the reactivation step, with the consequence that such stable salts, e. g. thiocyanate and formate salts, accumulate in the absorbent solution. The proportion of formic acid and thiocyanic acid in the feed stream of acid gas is usually small even in respect to the hydrogen sulfide therein, but the accumulation of stable salts in the recycled absorbent is a serious problem in refinery practice. The inactivation of absorbent by such formation of heat-stable salts sometimes occurs at a rate up to one percent or more of the alkanol amine per day. The absorbent solution is usually unfit for further use as an absorbent when about half of the alkanol amine therein has been neutralized by stable salt formation and is frequently unsatisfactory at much lower levels of inactivation.

Alkanol amine absorbent solutions which have become inactivated by stable salt formation can be treated by addition thereto of a strong inorganic soluble alkali such as sodium hydroxide which reacts metathetically with the alkanol amine salts to form sodium salts, e. g. sodium thiocyanate and sodium formate, and to regenerate at least a portion of the alkanol amine. Such procedure is at best only a temporary expedient since the accumulation of sodium salts soon becomes intolerable in the recycled absorbent.

The inactivated alkanol amine absorbent can sometimes be restored by treatment thereof with an excess of strong inorganic alkali such as sodium hydroxide and separation of the alkanol amine by distillation or extraction. Such a rigorous reclamation step is costly and recovery of the alkanol amine is seldom complete. Moreover, such a method requires withdrawing the absorbent from the absorption process, which necessitates shutting down the plant until the absorbent has been reclaimed, or providing an additional quantity of absorbent for use while the inactive absorbent is being recovered, or some other such undesirable expedient.

An object of this invention is to provide an improved method of removing acidic constituents from fluids by means of absorbents which comprise alkanol amines. A particular object is to provide such an improved method for reactivating spent alkanol amine absorbents employed in cyclic processes for scrubbing acid gases from hydrocarbon gas streams, which spent alkanol amine absorbents comprise heat-stable alkanol amine salts, e. g. of thiocyanic acid, and/or formic acid. A further object is to provide such a method in which at least a part of the alkanol amine which is in the spent absorbent in the form of thermally stable salts is regenerated therefrom without addition of inorganic cations to the regenerated absorbent and without interruption of the cyclic process. Another object is to provide such an improved cyclic method in which the concentration of stable salts of the alkanol amine absorbent is restrained at a non-objectionable level. Another object is to provide such an improved process which is readily and economically applicable to existing plant gas scrubbing processes. Additional objects and advantages will be evident from the following description of the invention wherein reference is made to the accompanying drawing which is a schematic representation of a fluid scrubbing plant embodying the improved method.

The objects of this invention are attained in a new and improved method hereinafter described in detail which comprises the step of contacting an alkanol amine absorbent with a strongly basic anion exchange resin of a kind and under conditions hereinafter particularly specified.

The invention is based upon the discovery of a simple means of splitting stable salts of alkanol amines, and includes the discovery of an anion exchange resin particularly efficacious in splitting thiocyanate and formate salts of amines in aqueous media of high pH value, the discovery of suitable conditions under which the thiocyanate and formate anions can be selectively absorbed from aqueous alkanolamine media, and the discovery of suitable means for regenerating the exhausted anion exchange material.

The new and improved method of the present invention can be better visualized by reference to a particular illustration and to the accompanying drawing which is a schematic representation of embodiment of apparatus in which the method of this invention can be practiced. The drawing is intended to illustrate the orderly flow of process materials and is adapted to an orderly presentation of the description of the invention rather than implying any particular kind or arrangement of apparatus. It should be understood that the invention is not limited to any particular kind or arrangement of apparatus, but is directed to procedural steps which may be carried out in any appropriate apparatus.

Referring to the drawing, 10 represents a vessel, generally called an absorber, absorbing column, or scrubber, for contacting an acid-containing fluid, such as a petroleum liquid or gas entering through line 11 and control valve 12, with an alkanol amine absorbent in the liquid form, such as an aqueous medium comprising an alkanol amine, entering through valved line 13. The scrubbed fluid and the alkanol amine absorbent liquid are separately withdrawn from absorber 10, e. g. via lines 14 and 15 respectively. When the acid-containing fluid is a sour gas stream, such as a hydrocarbon overhead gas stream from a petroleum refinery gasoline stabilizer, or a lighter-than-water liquid such as kerosene, the fluid is preferably fed into the bottom of a vertical scrubber, usually containing plates or packing material, and passed upward countercurrent to the aqueous absorbent passing downward. The purified fluid is thereby separated at the top of the scrubber or absorber column and the spent absorbent at the bottom as indicated in the drawing. During contact of the fluids in the absorber, the acidic constituents of the feed fluid, e. g. sour gas, at least in part are absorbed by and reacted with the alkanol amine absorbent to form soluble, non-volatile salts in which the alkanol amine supplies the cation and the absorbed acid supplies the anion. Thus, hydrogen sulfide reacts with the alkanol amine to form hydrosulfides and sulfides thereof, carbon dioxide forms bicarbonates and carbonates, thiocyanic acid forms thiocyanates, formic acid forms formates, etc. The absorbent withdrawn from the absorber 10, therefore, contains at least a part of the acids, initially in the sour feed fluid, in the form of alkanol amine salts. A part of the alkanol amine is thereby neutralized or inactivated. The effluent absorbent from the absorber 10 is variously called spent solution, rich solution, fat solution or foul solution and will herein be called spent absorbent.

The spent absorbent is withdrawn from absorber 10 through line 15, at a rate controlled by a liquid level control device 16 on the bottom of absorber 10 and cooperating with valve 17, and is pumped to a reactivator 18. In reactivator 18, the spent absorbent is contacted with steam, either generated at the bottom of column 18 by boiling a part of the aquous absorbent by means of heating coils 19 or some other suitable heating device, or by live steam introduced directly into 18 by means not shown. The heating process causes a thermal dissociation of the alkanol amine salts of the absorbed acids to a degree dependent in part on the strength of the particular acid. Alkanol amine sulfides and hydrosulfides appear to be readily dissociated by boiling the aqueous alkanol amine absorbent solution, while the alkanol amine carbonates and bicarbonates are only slightly less readily dissociated. The dissociated gases, e. g. hydrogen sulfide and carbon dioxide, are evolved from the aqueous solution in the reactivator 18 and are carried upward with the steam vapors out of the reactivator 18 via line 19 to a condenser 20 where the steam is condensed. From the separator box 21, the acid gases, e. g. hydrogen sulfide and carbon dioxide, may be withdrawn via line 22; the steam condensate may be returned to the column via line 23 or may be withdrawn in whole or in part via valved line 24. The dissociation of thermally unstable salts of alkanol amines in reactivator 18 results in the regeneration of alkanol amine from such salts. The heated and steam-treated aqueous alkanol amine solution, generally called reactivated absorbent, is withdrawn from the bottom of 18 via line 25, at a rate controlled by a liquid level control device 26 on the bottom of 18 cooperating with control valve 27, and is pumped, usually in heat exchange with the spent absorbent in line 15 through heat exchanger 28, thence through additional cooling in cooler 29 and back to the absorber column 10 to be recycled. Thereafter, feed of alkanol amine absorbent through line 13 is discontinued except to make up for loss or withdrawal of absorbent from the system.

As thus far described above, the practice is conventional and well known to those skilled in the art. It is also well known that not all of the acids absorbed from the feed and present as alkanol amine salts in the spent absorbent are liberated in the reactivator. In general, any acid which, in water solution, has a degree of ionization or dissociation which is greater than the degree of ionization or dissociation of carbonic acid will form, with an alkanol amine, a thermally stable salt, i. e., a salt which is not readily dissociated upon boiling of an aqueous alkanol amine solution thereof. Thus, for example, alkanol amine thiocyanates and formates in the spent absorbent are not appreciably affected by passage through the reactivator 18. Therefore, the so-called "reactivated absorbent" flowing through line 25 back to the absorber 10 is in fact only partially reactivated, i. e. the absorbent is substantially reactivated in respect to sulfides and carbonates but is partially inactivated by the presence of thiocyanate and formate salts. During continued recycling of such absorbent, the concentration of such salts normally increases with a resultant decrease in the proportion of active alkanol amine.

According to the new and improved method of this invention, at least a portion of the so-called activated absorbent flowing through line 25 is further activated by contact with certain anion exchange materials which are hereinafter particularly specified.

Referring again to the drawing, the portion of the drawing included within the dotted line rectangle ABDEA represents facilities providing for several modifications of the step of treating the so-called reactivated absorbent with anion exchange materials according to this invention. To this end, at least a portion of the absorbent flowing through line 25 is withdrawn via valved line 30 or valved line 31 to anion exchange chamber 32 or 33 respectively. 32 and 33 represent identical anion exchange chambers which may be employed singly or jointly. By being used alternately, one on stream while the other is undergoing regeneration, they permit continuous treatment of the alkanol amine absorbent. However, one such chamber alone can be used, or additional such parallel chambers not shown can be provided. The treated effluent from chambers 32 and 33 can be conducted via valved lines 34 and 35 or via line 36, respectively, to valved line 37 and line 44 and thence back to line 25 and returned to the absorber 10. The procedure just described is known herein as a one-stage treatment because an increment of treated material traverses but one anion exchange chamber although several such chambers may be provided in parallel. For such one-stage treatment, the facilities enclosed in area ABCFA only of the drawing are needed, and the facilities enclosed in area CDEFC may be omitted. However, for reasons hereinafter explained, it is often desirable to give further anion exchange treatment to the effluent from chambers 32 and 33. For this purpose, second stage anion exchange chambers 38 and 39 are provided into either of which the effluent from either exchanger 32 or 33 can be conducted via valved lines 34, 35, 36, 40 and 41 as is evident from the drawing. Again, chambers 38 and 39 may be employed singly or jointly and are preferably employed alternately, one being on stream while the other is undergoing regeneration. However, one such chamber alone can be used, or additional such parallel chambers can be provided. The treated effluent from chambers 38 and 39 can be conducted via valved line 42 and 43, respectively, to line 44 back to line 25 and returned to the absorber 10. Such procedure as hereinbefore described is known herein as a two-stage treatment inasmuch as an increment of treated material traverses successively two distinct anion exchange chambers, e. g. chambers 32 and 38, in series with each other. Further stages can be provided in additional chambers, not shown, if desired.

The anion exchange materials preferably employed in the treatment of alkanol amine absorbents containing thiocyanate and formate salts in accordance with this invention are strongly basic water-insoluble resinous anion exchange materials having, as active anion exchange groups, quaternary alkyl alkanol ammonium radicals in the hydroxide form. Anion exchange materials of this type are described by William C. Bauman and Robert McKeller in U. S. Patent No. 2,614,099 as the reaction products of a halomethylated derivative of a benzene-insoluble copolymer (containing in chemically combined form from 0.5 to 40 percent by weight of a polyvinylaromatic hydrocarbon and from 99.5 to 60 percent of a monovinyl aromatic hydrocarbon or nuclear halogenated derivative thereof), which halomethylated copolymer contains an average of from 0.2 to 1.2 halomethyl groups per aromatic nucleus in the copolymer, with a tertiary mono- or di-alkyl N-substituted alkanol or alkanediol amine in amount such that there is present in the reaction mixture at least one mole of tertiary amine for each halomethyl group in the copolymer. Such anion exchange resins are usually derived from a granular or globular benzene-insoluble copolymer of styrene, ethylvinylbenzene and divinylbenzene by chloromethylating that copolymer with chloromethyl methyl ether and reacting the chloromethylated product with dimethylethanol amine, methyldiethanol amine, dimethylpropanol amine, 1-dimethylamino-2,3-propanediol and like mono- or di-alkyl N-substituted alkanol amines or alkanediol amines. The resultant resinous quaternary alkyl alkanol ammonium chlorides are converted to the corresponding hydroxide form by treatment with an aqueous solution of a strong alkali, e. g. sodium hydroxide. Such anion exchange resins are strongly basic and they all contain a basic nitrogen atom of a tertiary mono- or di-alkyl N-substituted alkanol or alkanediol amine attached to a methyl substituent on an aromatic nucleus of the resin. They may more simply be identified as strongly basic anion exchange resins having as active anion exchange radicals quaternary alkyl alkanol ammonium hydroxide radicals.

It has now been discovered that such anion exchange resins in the hydroxide form are capable of chemically absorbing thiocyanate and formate ions, even from strongly basic aqueous solutions comprising considerable proportions of alkanol amines. When, therefore, an alkanol amine aqueous solution comprising alkanol amine thiocyanate and formate is contacted with a strongly basic quaternary alkyl alkanol ammonium hydroxide anion exchange resin of the type described, the thiocyanate and formate ions are replaced in solution by hydroxyl ions from the resin and the treated alkanol amine solution is substantially free of thiocyanate and formate ions. By such a step, the alkanol amine absorbent is completely regenerated and restored.

The strongly basic quaternary alkyl alkanol ammonium anion exchange material hereinbefore described has a preferential selectivity for thiocyanate ions relative to formate and hydroxyl ions and a preferential selectivity for hydroxyl ions relative to formate. Tests of such anion exchange material, using aqueous alkanol amine absorbent liquors having thiocyanate and formate salts therein, have shown that the operating capacity of completely hydroxide form resin to breakthrough of thiocyanate ions is approximately 90 percent of the total anion capacity, while the operating capacity of completely hydroxide form resin to breakthrough of formate ions is approximately 50 percent of the total anion capacity.

Such a resin bed, exhausted with formate ions, is readily regenerated by treatment with aqueous alkali, preferably sodium hydroxide, solution. Tests have shown that such a formate-exhausted resin can be substantially completely regenerated with approximately 50 percent sodium hydroxide efficiency, i. e. by treatment with approximately twice the amount of sodium hydroxide theoretically required for the regeneration.

However, the great selectivity of the resin for thiocyanate ions makes adequate regeneration of a thiocyanate-exhausted resin much more difficult. Tests have shown that approximately 12 percent of the capacity of a thiocyanate-exhausted resin is recovered by treatment with aqueous sodium hydroxide at an alkali efficiency of about 12 percent.

The above facts mean that, when such a resin is used repeatedly through an exhaustion cycle with an influent comprising only formate ions but not thiocyanate ions and a regeneration cycle with aqueous sodium hydroxide, the capacity of the resin remains high and the regeneration is efficient. When an influent is used comprising only thiocyanate ions and no formate ions, the initial capacity is high, but, because sodium hydroxide regeneration of the thiocyanate-exhausted resin is incomplete, the capacity of the resin in subsequent exhaustion cycles is reduced. When such a resin is employed with an influent comprising both thiocyanate and formate ions and, after exhaustion, is regenerated with an aqueous sodium hydroxide solution, the resin is found to have a low total operating capacity on the exhaustion cycle and a low alkali efficiency on regeneration.

For the treatment of such alkanol amine absorbents containing both thiocyanate ions and formate ions, the preferred method of this invention contemplates a two-stage ion-exchange process as mentioned hereinbefore in connection with the drawing, wherein the influent is passed through a first bed of the specified resin (exchanger 32 and/or 33 of the drawing), then subsequently through a second bed of the same specified resin (exchanger 38 and/or 39). On the exhaustion cycle the first bed is preferably operated until incipient breakthrough of thiocyanate occurs, even though breakthrough of formate has occurred earlier; the second bed, in series with the first, is preferably operated to incipient breakthrough of formate ions.

The second stage resin operating on an influent substantially free of thiocyanate ions, has a high capacity for formate ions and, when exhausted, is readily regenerated at high efficiency with aqueous sodium hydroxide or equivalent alkali in the well-known manner. Referring again to the drawing, when the second-stage exchanger, e. g. exchanger 38, is exhausted due to chemical absorption of formate ions, the flow of formate-containing liquor to said exchanger is interrupted, for instance by closing valved line 40. The liquor previously fed to exchanger 38 may then be conducted to a parallel and previously regenerated exchanger, e. g. exchanger 39, via valved lines 35 and 41. Exchanger 38 is then "sweetened off" by passing water from source 45, through valved line 46, through exchanger 38 and through line 42 into the process stream. When the exchanger 38 has been adequately purged of process materials, valved line 42 is closed and an aqueous solution of a strong alkali, e. g. sodium hydroxide, is passed from source 47 through line 46, exchanger 38 and drain line 48, out of the system. Thereby, exchanger 38 is substantially regenerated to the hydroxide form. At the end of the alkali treatment of exchanger 38, water is again passed from source 45 through line 46, exchanger 38 and line 48 until the free alkali is substantially flushed out of exchanger 38. Valved lines 46 and 48 are then closed, and exchanger 38 is ready to go "on stream" again. Similarly, exhausted exchanger 39, can be regenerated by cutting off flow of influent through valved line 41, "sweetening off" by passing water from source 45 through valved line 49, exchanger 39 and line 43; cutting off the flow of water and closing line 43; treating exchanger 39 by passing aqueous alkali, e. g. sodium hydroxide, from source 47 through line 49, exchanger 39 and drain line 50; flushing water through line 49, exchanger 39 and drain line 50; and closing valved lines 49 and 50, whereby exchanger 39 is again ready to go "on stream."

The first stage exchangers 32 and 33, after thiocyanate exhaustion, can also be treated with an aqueous sodium hydroxide solution in a manner analogous to the procedure just described for the second stage exchangers 38 and 39. However, as previously explained, the regeneration of an exhausted thiocyanate exchanger by means of sodium hydroxide is incomplete and inefficient. An improved means of more completely and more efficiently regenerating an exhausted thiocyanate exchanger has been devised and is contemplated as a part of this invention. This improvement is called a "two-step reversed flow regeneration process" and comprises the steps of converting at least a part of the exhausted thiocyanate exchanger to a polyvalent anion form by treatment with a dilute aqueous solution of a polyvalent anion salt, e. g. a sulfate salt, and thereafter converting the exchanger, at least in part, to the hydroxide form by treatment with an aqueous solution of a strong alkali, such as sodium hydroxide, the direction of flow of both of such regeneration treatments being counter to the direction of flow of the process liquor during the exhaustion step. Referring again to the drawing, assume that exchanger 32 has become exhausted with thiocyanate ions removed from a thiocyanate-containing influent entering via line 30. During regeneration of exchanger 32, valved line 30 is closed and the flow of process liquor may be diverted to a parallel and previously regenerated exchanger, e. g. exchanger 33 via line 31, if desired. Exchanger 32 is then "sweetened off" by passing water from source 51 through valved line 52, exchanger 32 and through line 34 into the process stream. After "sweetening off," valved line 34 is closed, the flow of water is cut off and a dilute aqueous solution of a soluble salt comprising a polyvalent anion, e. g. sodium sulfate, is passed from source 53 through line 54, through exchanger 32 in a direction counter to the normal flow therethrough during the exhaustion cycle, out of line 52 to drain line 55 and out of the system. When a substantial proportion of exchanger 32 has been converted to the sulfate form, flow of sulfate solution from source 53 is interrupted and flow of aqueous alkali, e. g. sodium hydroxide, is begun from source 56, through line 54, exchanger 32, lines 52 and 55 and out of the system. When a substantial conversion of exchanger 32 to the hydroxide form has been effected, flow of alkali solution from source 56 is interrupted and exchanger 32 is flushed with water from source 51 flowing through line 54, exchanger 32 and out through lines 52 and 55. Thereafter, valved lines 52 and 54 are closed and exchanger 32 is again ready to go "on stream."

In similar manner, exchanger 33, when exhausted, is regenerated by closing valved line 31; "sweetening off" by passing water from source 51 through line 57; cutting off the flow of water from source 51; closing valved line 36; passing sulfate solution from source 53 through line 58 and exchanger 33, in a direction counter to the direction of normal flow therethrough during the exhaustion cycle, through lines 57 and 55 and out of the system; cutting off flow of sulfate solution from source 53; passing aqueous alkali hydroxide solution from source 56 through line 58, exchanger 33, lines 57 and 55 out of the system; cutting off the flow of alkali from source 56; flushing soluble compounds out of exchanger 33 by passing water from source 51 through line 58, exchanger 33, lines 57 and 55 out of the system; and closing valved lines 57 and 58, whereby 33 is again ready to go "on stream."

Tests have shown that a thiocyanate exhausted resin can be regenerated by the above-described two step reverse flow regeneration procedure to about 45 percent of the total capacity with about 80 percent efficiency using a 0.01 normal solution of sodium sulfate. About 50 percent of the exchange capacity can be converted to sulfate at 23 percent efficiency with 0.1 normal sodium sulfate. The sulfate of the exchanger can be converted to the hydroxide form with about 75 to 90 percent alkali efficiency using 2.7 normal sodium hydroxide solution. The net overall degree of regeneration of the exchanger and the chemical efficiency of the two-step reverse flow regeneration process are considerably greater than are obtained by a conventional one-step alkali regeneration process; i. e., the two-step reverse flow regeneration procedure contributes to the practicality of the present method.

In some instances, it is expedient to regenerate the first stage exchanger with a single step strong alkali treatment, even though the regeneration is incomplete and the capacity of the resin is progressively reduced during subsequent cycles. After such practice has reduced the capacity of the resin to an impractical level, the two-step reverse flow regeneration just described is then employed to regenerate the resin more completely.

In other instances, it may be desirable to regenerate the second stage anion exchangers by a two-step reverse flow process like that hereinbefore described for the first stage anion exchangers. For this purpose, auxiliary regeneration facilities, like those shown for the first stage anion exchangers 32 and/or 33 in the drawing, may also be provided (but are not shown in the drawing) for the second stage exchangers 38 and/or 39.

Other water-soluble polyvalent anion salts can be substituted for the sodium sulfate employed in the above illustration, e. g., sodium phosphate, potassium sulfate, potassium phosphate, iron sulfate, magnesium sulfate, ammonium sulfate, and ammonium phosphate. Salts of cations whose hydroxides are insoluble in water must be flushed out of the resin bed with water before treatment thereof with alkali. For economic reasons, the preferred polyvalent anion salt is sodium sulfate. It is important that the aqueous solution of the polyvalent anion salt be dilute, i. e. the solution should not exceed 0.5 normal and should preferably be from 0.01 to 0.2 normal in respect to the polyvalent anion salt.

Other strong alkalies can be substituted for sodium hydroxide in the regeneration of both the first stage exchangers and the second stage exchangers. Suitable other alkalies are potassium hydroxide and lithium hydroxide; for economic reasons, sodium hydroxide is preferred. The concentration of the aqueous alkali solution is preferably at least 1.0 normal, e. g. from 2 to 5 normal, in respect to the alkali therein.

The completely continuous process described above includes a "sweetening off" step and a "sweetening on" step when water is caused to be added to the exchanger effluent streams thereby slightly diluting the recycled process liquor. When an exchanger which has been "on stream" is to be regenerated, it is taken "off stream," i. e. the flow of process liquor thereto is stopped, and the exchanger is subjected to a "sweetening off" step wherein the portion of process liquor remaining in the body of the exchanger is displaced by water. The resulting diluted effluent is usually added to the normal process effluent. Similarly, when a regenerated exchanger is put back "on stream," the exchanger is subjected to a "sweetening on" step wherein the water contained in the resin is displaced by the process liquor thereby yielding an initial fraction of diluted effluent. Such added water is readily removed from the absorbent mixture via line 24 from the separator box 21 during the heating and steam-stripping reactivation step in such proportions as to restore the concentration of solutes in the recycle liquor to the desired level.

The completely continuous process described above in reference to the drawing provides for either the complete removal or the partial removal of thiocyanate and formate ions from the recycle alkanol amine absorbent. While complete removal of such anions from the recycled absorbent is possible by passing the whole stream of such recycled absorbent through the anion exchange step, in industrial practice it is seldom necessary to effect such complete treatment. Instead, it usually suffices in practice to control or limit the concentration of such anions to a harmless level, which can be attained by splitting the recycle stream and subjecting only a portion of it to anion exchange treatment as just described. Alternatively, the ion exchange treatment can be operated intermittently, allowing the concentration of stable salts to increase in the recycle absorbent without ion exchange treatment and periodically operating the anion exchange step to reduce the obnoxious anion content of the recycle absorbent to a lower level. The invention also contemplates operating the anion exchange step in a batch-wise fashion on inactivated alkanol amine absorbent material which has been withdrawn from an acid gas scrubbing process.

The invention can also be applied to the so-called "split-stream" acid gas absorption process in which a partially reactivated absorbent is withdrawn from a midpoint of the thermal reactivation column and is fed to a midpoint of the absorber column. In such a process, the anion exchange step of this invention is preferably applied to that portion of the reactivated absorbent which is substantially free of dissolved hydrogen sulfide.

The anion exchange treatment of alkanol amine absorbents can also be applied to a process in which the scrubbed acid fluid contains no hydrogen sulfide or carbon dioxide, but only the acids which form thermally stable salts with alkanol amines. In such cases, the heating and/or steam distillation step can be omitted or employed on only a portion of the absorbent stream to effect control of the concentration thereof.

Broadly, the invention is applicable to the treatment of an aqueous liquid solution of an alkanol amine, which solution contains the alkanol amine salt of an acid whose dissociation constant is greater than the dissociation constant of carbonic acid, in order to effect a removal of anions of such an acid from the solution.

The invention will now be illustrated with an example which should not be construed as limiting the invention. Throughout the example, the anion exchange materials referred to are strongly basic resinous anion exchange materials in the form of spheroidal beads and are made in accordance with the description in U. S. Patent No. 2,614,099 issued October 14, 1952 to William C. Bauman and Robert McKellar, although any anion exchange material having anion exchange properties equivalent thereto may be substituted.

EXAMPLE

A sample of alkanol amine absorbent was withdrawn from a commercial acid gas scrubbing plant. The absorbent was an aqueous solution of diethanol amine and was employed in a regenerative process comprising an absorption step and a heating and steam stripping reactivation step. The sample was obtained from the so-called reactivated absorbent stream and was substantially free of hydrogen sulfide and carbon dioxide. The absorbent was partially inactivated by the presence of stable salts and had the following composition by analysis, the medium being water:

| | |
|---|---|
| Free diethanol amine | 1.323 N |
| Total salts of diethanolamine | 0.508 N |
| Thiocyanate salt | 0.068 N |
| Formate salt | 0.440 N |

The symbol "N" is used in this example to designate concentration of a solute in a solution in terms of normality.

The above material was subjected to a two-stage anion exchange treatment which comprised passing the material successively through two separate beds of anion exchange material in series. The first bed was 60 inches deep and was contained in a percolation tube ½ inch in diameter. The second bed was 36 inches deep in a tube ⅝ inch in diameter. Both tubes were mounted with the long axis vertical and were provided with the usual appurtenances for ion exchange operations. The first bed was operated to thiocyanate breakthrough and was regenerated by a two-step reverse flow process using sodium sulfate and sodium hydroxide as hereinafter specified. The second bed was operated to formate breakthrough and was regenerated by a one-step sodium hydroxide treatment as hereinafter specified. The first bed was operated repeatedly through an exhaustion cycle with the above feed and with a regeneration cycle as hereinafter described in order to establish an equilibrium condition in the operation of the process. Similarly, the second bed was operated repeatedly through an exhaustion cycle with the effluent from the first bed as influent to the second and with a regeneration cycle as hereinafter described in order to establish an equilibrium condition in the operation of the process. The following, then, is a description of a two-stage anion exchange treatment of a typical alkanol amine absorbent under equilibrium conditions.

A portion of the above described diethanol amine absorbent solution was fed to the top of the first resin bed (which initially was filled with water) at a rate of about 5 ml. per minute (equivalent to approximately 1 gallon per minute per square foot cross-section of the bed) and allowed to flow downward through the bed. A first fraction of effluent, of about 70 ml. and consisting principally of water substantially free of amine, was collected and discarded. Thereafter, 100 ml. fractions of effluent were collected and analyzed. In Table I is shown the thiocyanate salt concentration in each of the numbered successive 100-ml. fractions of effluent so collected.

*Table 1*

| Effluent fraction | Thiocyanate Salt Normality |
|---|---|
| 1 | 0.0000 N |
| 2 | 0.0000 N |
| 3 | 0.0000 N |
| 4 | 0.0002 N |
| 5 | 0.0005 N |
| 6 | 0.0015 N |
| 7 | 0.0045 N |

The composite effluents of a number of such first-stage anion exchange treatments had the following composition by analysis:

| | |
|---|---|
| Free diethanol amine | 1.361 N |
| Total salts of diethanolamine | 0.400 N |
| Thiocyanate salt | 0.0017 N |
| Formate salt | 0.3983 N |
| Total amine | 1.761 N |

A portion of the above-described composite effluent from the first-stage ion exchange treatment was fed to the top of the second resin bed (which initially was filled with water) at a rate of about 8 ml. per minute (equivalent to about 1 gallon per minute per square foot cross-section of the bed) and allowed to flow downward through the bed. A first fraction of effluent, of about 70 ml. and consisting principally of water substantially free of amine, was collected and discarded. Thereafter, 50-ml. fractions of effluent were collected and analyzed. In Table II are shown the free amine concentration and the total salt concentration in each of the numbered successive 50-ml. fractions of effluent so collected.

*Table II*

| Effluent Fraction | Free Amine Normality | Amine Salt Normality |
|---|---|---|
| 1 | 0.78 | 0.00 N |
| 2 | 1.524 | 0.00 N |
| 3 | 1.70 | 0.00 N |
| 4 | 1.736 | 0.024 N |
| 5 | 1.71 | 0.05 N |

The composite effluent from the second-stage anion exchange treatment was substantially free of salts of the alkanol amine, i. e. was substantially free of anions corresponding to acids in the form of salts of the alkanol amine.

The anion exchange resins employed in the exhaustion cycles described above were thereafter regenerated as described below.

The first stage resin bed employed above was rinsed by flowing about 250 ml. of deionized water therethrough and regenerated by a two-step reverse flow process as follows:

A 0.05 N sodium sulfate aqueous solution was passed upward through the first-stage resin bed at a rate of about 12.5 ml. per minute (equivalent to about 2.5 gallons per minute per square foot cross-section of the bed) until about 5,200 ml. of such sodium sulfate solution had been passed through the bed (such treatment being equivalent to about 6 pounds of sodium sulfate per cubic foot of the resin bed). The bed was again rinsed with about 250 ml. of deionized water passed upward through the bed. The rinse was followed by a 2.7 N sodium hydroxide aqueous solution at a rate of 5 ml. per minute (equivalent to about 1 gallon per minute per square foot cross section of resin bed) until about 114 ml. of such sodium hydroxide solution (equivalent to about 4 pounds of sodium hydroxide per cubic foot of the resin bed) had been passed into the bed. The bed was finally rinsed, also in an upward direction, with about 1000 ml. of deionized water, thereby placing the first-stage resin bed in a condition like that at the beginning of the exhaustion cycle described in this example.

The second-stage resin bed employed in this example was rinsed by flowing about 250 ml. of deionized water therethrough and regenerated as follows:

A 2.7 N sodium hydroxide aqueous solution was passed downward through the rinsed second-stage anion exchange resin bed at a rate of about 8 ml. per minute (corresponding to about 1 gallon per minute per square foot cross-section of the bed) until about 107 ml. of such sodium hydroxide solution (equivalent to about 4 pounds of sodium hydroxide per cubic foot of the resin bed) had been passed into the bed. The bed was finally rinsed with about 1000 ml. of deionized water, thereby placing the second-stage anion exchange resin bed in a condition like that at the beginning of the exhaustion cycle described in this example.

Computations based on these tests show that the first-stage anion exchanger was operated at a capacity of about 0.23 milligram equivalent of acid anion per milliliter of resin bed, while the second-stage anion exchanger was operated at a capacity of about 0.56 milligram equivalent of acid anion per milliliter of resin bed. The theoretical total anion exchange capacity of both resins was about 1.04 milligram equivalents per milliliter of resin bed.

We claim:

1. A method which comprises the step of contacting an aqueous solution of an alkanol amine, which solution contains an alkanol amine salt of at least one acid whose dissociation constant is greater than the dissociation constant of carbonic acid, with a strongly basic anion exchange resin having, as active anion exchange radicals, quaternary alkyl alkanol ammonium hydroxide radicals.

2. In a method which comprises the steps of contacting a petroleum hydrocarbon fluid containing as impurities therein at least one normally gaseous acid and at least one normally non-gaseous acid with a liquid aqueous solution of an alkanol amine, separating a liquid aqueous solution of an alkanol amine comprising alkanol amine salts, and heating such solution to boiling whereby normally gaseous acids which in water solution have a dissociation constant not greater than the dissociation constant of carbonic acid are substantially expelled from a residual liquid aqueous solution of an alkanol amine containing at least one alkanol amine salt of an acid whose dissociation constant is greater than the dissociation constant of carbonic acid, the improvement that comprises contacting such residual solution with a strongly basic anion exchange resin having, as active anion exchange radicals, quaternary alkyl alkanol ammonium hydroxide radicals.

3. In a method which comprises the steps of contacting a petroleum hydrocarbon fluid containing as impurities therein at least one normally gaseous acid and at least one normally non-gaseous acid with a liquid aqueous solution of an alkanol amine, and separating a liquid aqueous solution of an alkanol amine comprising alkanol amine salts selected from the group consisting of alkanol amine thiocyanates and alkanol amine formates, the improvement that comprises contacting such solution with a strongly basic anion exchange resin having, as active anion exchange radicals, quaternary alkyl alkanol ammonium hydroxide radicals.

4. A method of treating an aqueous liquid solution of an alkanol amine which solution comprises the alkanol amine salts of acids which are not readily removed from such solution by such thermal treatments as are capable of removing acid gases of the class consisting of hydrogen sulfide and carbon dioxide, which method comprises contacting such solution with a strongly basic anion exchange resin having as active anion exchange radicals quaternary alkyl alkanol ammonium hydroxide radicals.

5. A method of treating an aqueous liquid solution comprising the alkanol amine salts of thiocyanic acid and formic acid, which method comprises contacting such solution with a first body of a strongly basic anion exchange resin and thereafter with a second body of a strongly basic anion exchange resin, the resins in both of said bodies being ones having, as active anion exchange radicals, quaternary alkyl alkanol ammonium hydroxide radicals.

6. A method of treating an aqueous liquid solution comprising the alkanol amine salts of thiocyanic and formic acid, which method comprises passing such solution into and through a first bed of a strongly basic anion exchange resin until such bed is at least partially exhausted in respect to its capacity to absorb thiocyanate anion, passing the effluent from such first bed of anion exchange resin into and through a second bed of a strongly basic anion exchange resin until such bed is at least partially exhausted in respect to its capacity to absorb formate anion, each of said beds comprising a strongly basic anion exchange resin in particulate form and having, as active anion exchange radicals to the corresponding polyvalent nium hydroxide radicals, the first such bed being regenerated after thiocyanate anion absorption by a two-step regeneration comprising the steps of passing into and through such bed, in a direction of flow opposite to the direction of flow of the alkanol amine solution, an aqueous solution of a soluble polyvalent anion salt in such quantity as to convert a substantial proportion of the anion exchange radicals to the corresponding polyvalent anion salt form, thereafter passing an aqueous solution of a strong alkali hydroxide into and through said first bed of anion exchange resin in the same direction of flow as that of the polyvalent anion salt solution and in such quantity as to convert a substantial proportion of the anion exchange radicals to quaternary alkyl alkanol ammonium hydroxide radicals, the second such bed being regenerated after formate anion absorption by a one-step regeneration comprising passing into and through such bed, in the same direction of flow as that of the alkanol amine solution, an aqueous solution of a strong alkali hydroxide in such quantity as to convert a substantial proportion of the anion exchange radicals to quaternary alkyl alkanol ammonium hydroxide radicals.

7. In an acid gas absorption process wherein an aqueous liquid solution comprising the alkanol amine salts of dissolved hydrogen sulfide, thiocyanic acid and formic acid is obtained and wherein the aqueous liquid solution is treated thermally to eliminate the dissolved hydrogen sulfide, whereby there is obtained an aqueous liquid solution comprising an alkanol amine and alkanol amine salts of thiocyanic acid and formic acid, the step of contacting at least a part of such last named aqueous liquid solution with a strongly basic anion exchange resin having, as active ion exchange radicals, quaternary alkyl alkanol ammonium hydroxide radicals.

8. A regenerative acid gas absorption process which comprises the steps of (A) contacting an acid gas with an aqueous liquid absorbent comprising an alkanol amine, whereby there is formed an aqueous liquid solution comprising a thermally unstable salt of an alkanol amine and a thermally stable salt of an alkanol amine; (B) heating at least a part of the last-named aqueous liquid solution comprising thermally unstable and thermally stable salts of an alkanol amine, whereby substantially all of the thermally unstable salt of the alkanol amine is dissociated and the acid corresponding thereto is substantially removed from the residual aqueous liquid solution comprising a thermally stable salt of the alkanol amine; (C) contacting at least a part of the residual aqueous liquid solution with a strongly basic anion exchange resin having, as active anion exchange radicals, quaternary alkyl alkanol ammonium hydroxide radicals, whereby there is obtained a substantial reduction in the proportion of thermally stable salts of an alkanol amine in the aqueous liquid absorbent comprising an alkanol amine, such aqueous liquid absorbent being returned to the acid gas absorption step.

9. A regenerative acid gas absorption process which comprises the steps of (A) contacting an acid gas with an aqueous liquid absorbent comprising an alkanol amine, thereby forming an aqueous liquid solution comprising an alkanol amine salt of dissolved hydrogen sulfide, an alkanol amine salt of thiocyanic acid and an alkanol amine salt of formic acid; (B) heating the last named aqueous liquid solution comprising alkanol amine salts of dissolved hydrogen sulfide, thiocyanic acid and formic acid thereby expelling hydrogen sulfide from an aqueous liquid solution residue comprising an alkanol amine and alkanol amine salts of thiocyanic acid and formic acid; (C) passing at least a part of the last named aqueous liquid solution residue comprising alkanol amine salts of thiocyanic acid and formic acid and which is substantially free of dissolved hydrogen sulfide into and through a first body of a strongly basic anion exchange resin and thence into and through a second body of a strongly basic anion exchange resin in particulate form, the active anion exchange radicals of both the first and second bodies of strongly basic anion exchange resin being quaternary alkyl alkanol ammonium hydroxide radicals, the flow of influent to the first anion exchange resin being continued until at least a portion of that resin is converted to the thiocyanate form, the effluent from the first resin being substantially free of thiocyanate ions, the flow of such effluent as influent to the second anion exchange resin being continued until at least a portion of that resin is converted to the formate form, the effluent from the second resin being substantially free of formate ions and thiocyanate ions, such effluent being returned to the acid gas absorption step; (D) regenerating the first body of anion exchange resin by means of a procedure comprising the steps of passing into and through such resin, in a direction of flow opposite to the direction of flow therethrough of the alkanol amine influent, an aqueous solution of a soluble sulfate salt in such quantity as to convert a substantial proportion of the anion exchange radicals to the sulfate form, thereafter passing an aqueous solution of a strong alkali hydroxide into and through said first body of resin in the same direction of flow as that of the aqueous sulfate salt solution and in such quantity as to convert a substantial proportion of the anion exchange radicals to quaternary alkyl alkanol ammonium hydroxide radicals; and (E) regenerating the second body of anion exchange resin of a procedure which comprises passing an aqueous solution of a strong alkali hydroxide into and through such second body of anion exchange resin in the same direction of flow as the direction of flow therethrough of the alkanol amine influent and in such a quantity as to convert a substantial proportion of the anion exchange radicals to quaternary alkyl alkanol ammonium hydroxide radicals.

10. The process of claim 9 wherein the soluble sulfate salt is sodium sulfate and the alkali hydroxide is sodium hydroxide.

References Cited in the file of this patent
UNITED STATES PATENTS 2,311,342   Kerns et al. _____ Feb. 16, 1943
2,497,954   McCulley _____ Feb. 21, 1950

OTHER REFERENCES

Nachod: "Ion Exchange" (1949), pages 23, 352–4.
Rohm and Hass Company, Ion Exchange Report No. 1, "Amber-hi-Lites" (1949) page 4 (back cover).